June 9, 1942. J. LIEN 2,286,144
FLOW INDICATOR
Filed Jan. 29, 1941 3 Sheets-Sheet 1
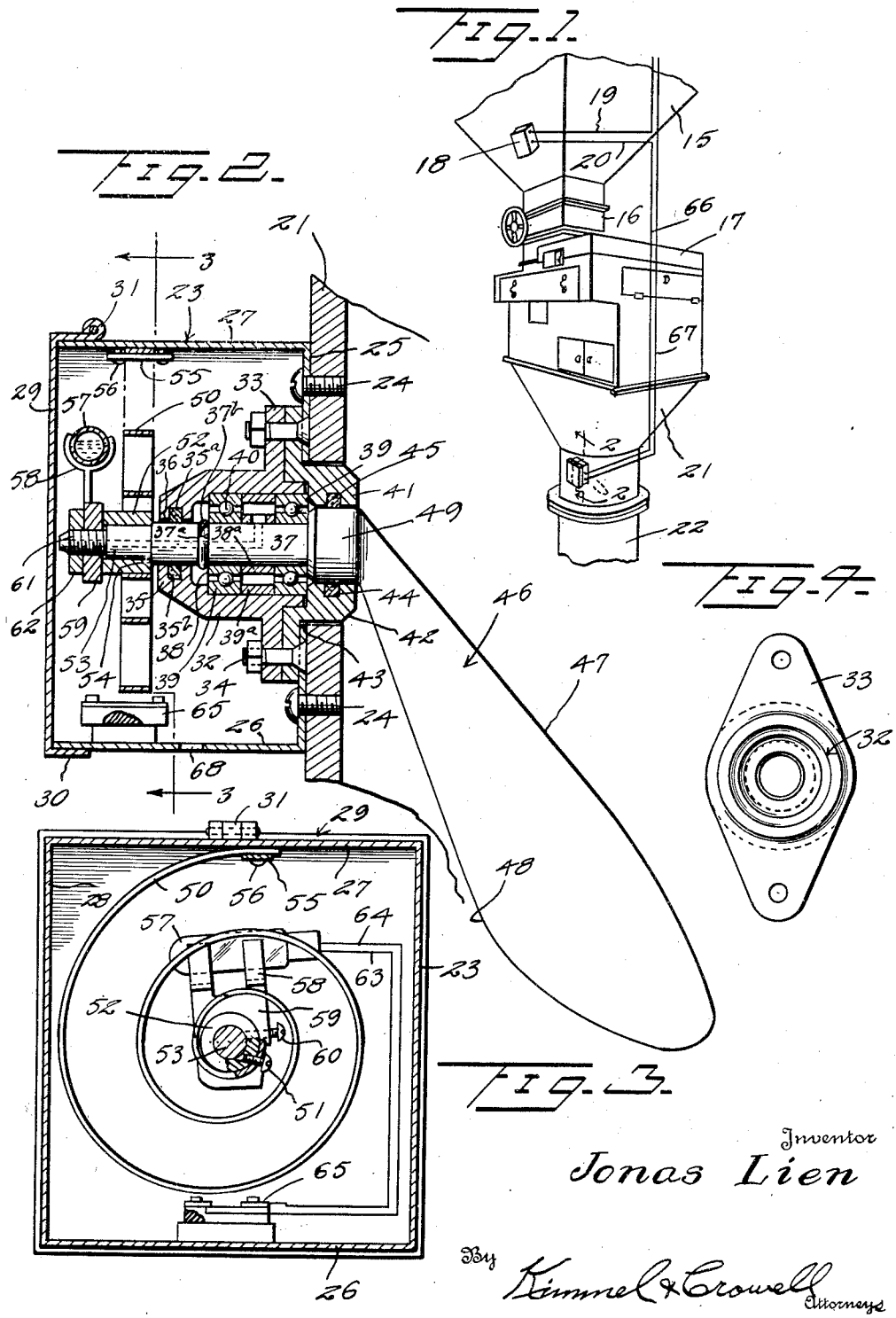
Inventor
Jonas Lien
By Kimmel & Crowell
Attorneys

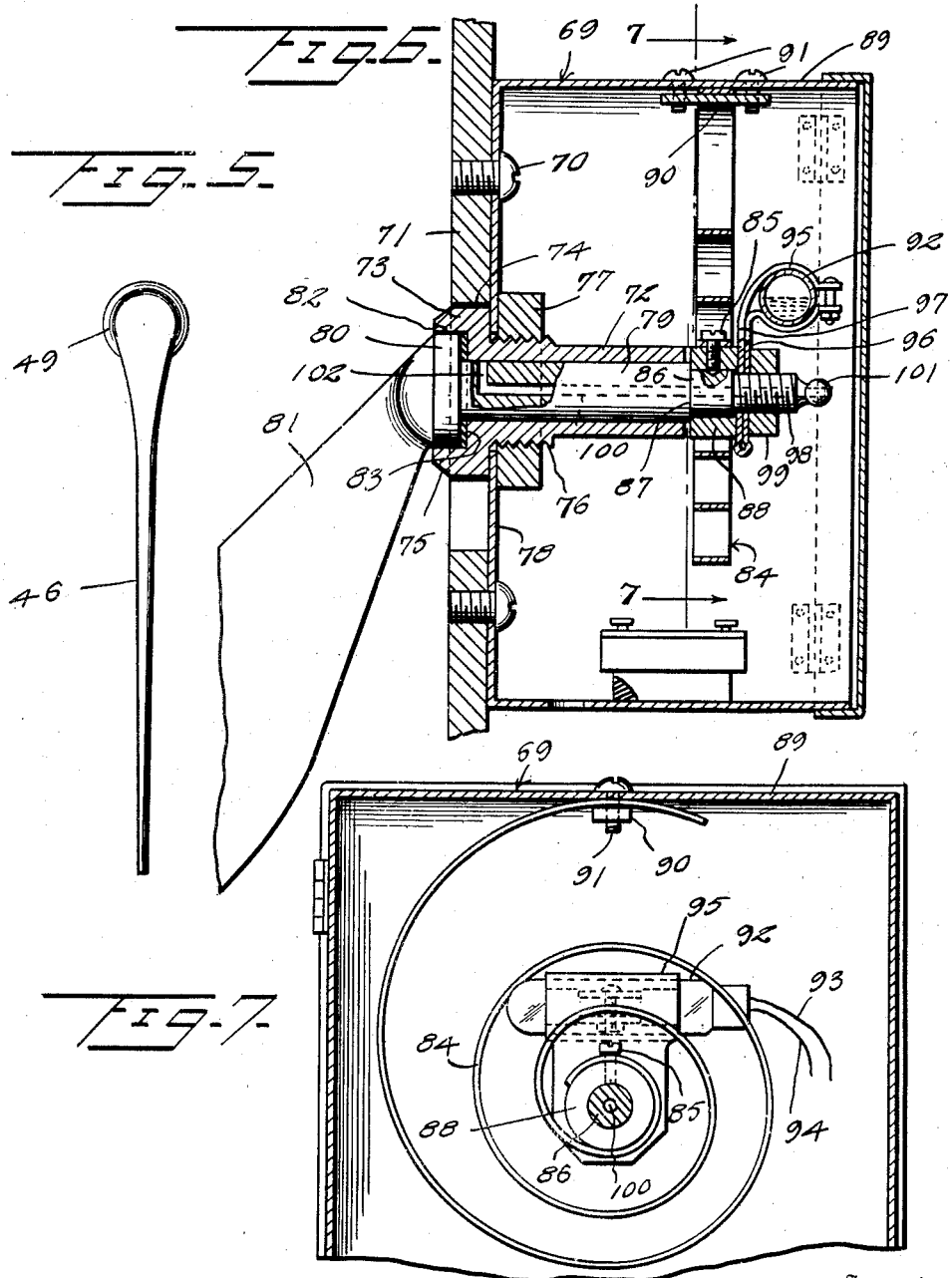

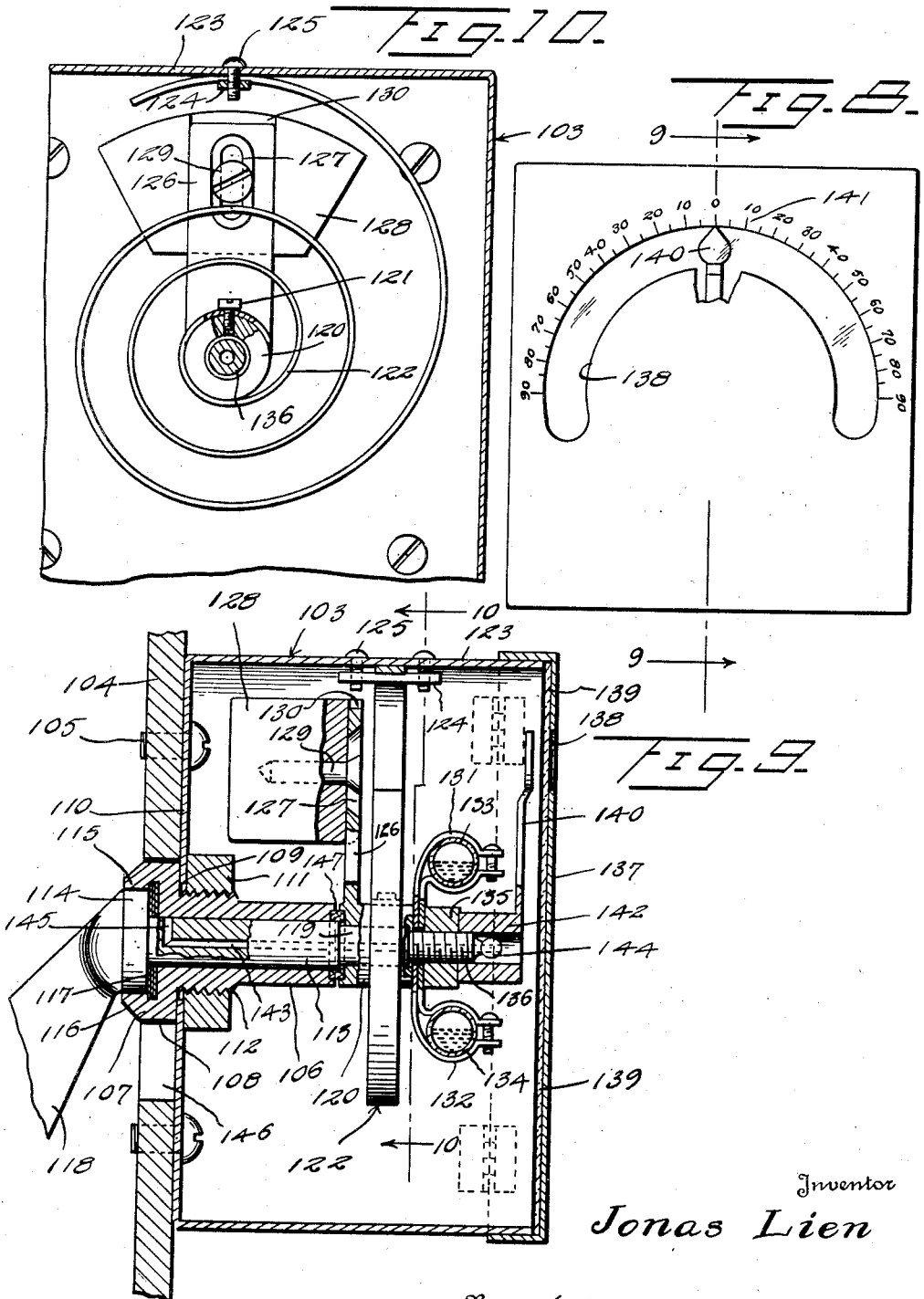

Patented June 9, 1942

2,286,144

UNITED STATES PATENT OFFICE 2,286,144

FLOW INDICATOR

Jonas Lien, Port Washington, N. Y.

Application January 29, 1941, Serial No. 376,555

5 Claims. (Cl. 200—52)

This invention relates to a flow controlled switch.

An object of this invention is to provide a switch and a flow controlled operator therefor which is so constructed that it will not impede the movement of material and will be self-cleaning so that the operator may be projected into a duct through which fibrous or like material is moving without causing a clogging of the duct.

Another object of this invention is to provide a switch and operator therefor wherein the operator is constructed in the form of a substantially flat blade which is pivoted at one end with the longitudinal axis of the blade disposed on an obtuse angle to the longitudinal pivot axis so that the leading edge of the blade will be continually cleaned.

A further object of this invention is to provide a switch and operator therefor including an indicating means for indicating the volume of fluid or other material moving past the switch.

A still further object of this invention is to provide a switch or indicator of this kind with an improved operator therefor so that the switch may be used to control or regulate the flow of fluid or other material, or may be used to indicate or regulate the amount of material placed in a bin or other place of storage.

A further object of this invention is to provide a flow indicating means which is so constructed that it may be readily adjusted for different kinds of fluids such as liquids or gases, or may be adjusted for granular, powdered or fibrous material.

A further object of this invention is to provide a flow indicating structure of this kind which may be used in various types of conveying ducts and may be disposed in a horizontal, vertical or angularly disposed duct.

Still another object of this invention is to provide in combination, a flow operated device which may indicate on a portion thereof the volume of material moving through a duct, and may also actuate one or more switches for making and breaking electric circuits to a remote visible or audible signal and the conveyor operator.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings—

Figure 1 is a perspective view of a coal weighing and delivering means having a flow indicator constructed according to an embodiment of this invention secured thereto.

Figure 2 is a sectional view taken on the line 2—2 of Figure 1.

Figure 3 is a sectional view taken on the line 3—3 of Figure 2.

Figure 4 is a detail rear elevation of one form of bearing housing used with this device.

Figure 5 is a detail end elevation of the self-cleaning shaft operator.

Figure 6 is a vertical section partly broken away of another form of switch structure and bearing used with the blade shown in Figure 5.

Figure 7 is a fragmentary sectional view taken on the line 7—7 of Figure 6.

Figure 8 is a detail front elevation of another form of this invention.

Figure 9 is a sectional view taken on the line 9—9 of Figure 8.

Figure 10 is a fragmentary sectional view taken on the line 10—10 of Figure 9.

Referring to the drawings and first to Figures 1 to 4, inclusive, the numeral 15 designates the hopper bottom portion of a bunker or storage bin from which coal or other material is adapted to be withdrawn by gravity through discharge valve 16 to weighing mechanism 17. The weighing mechanism includes a hopper 21 extending downwardly therefrom for discharging the coal or other material into a chute 22. The chute 22 may be connected to a pulverizing mill or to a stoker mechanism for delivering coal to a furnace or boiler. On hopper 15 may be adapted an electrically operated agitating, vibrating or feeding mechanism 18 which is connected by conductors 19 and 20 to a source of electric current supply.

In order to provide a means whereby the operator of the structure shown in Figure 1 may be warned about or be able to determine when the hopper 21 is empty and in order to provide a means whereby the vibrator mechanism 18 may be made active when the hopper 21 is empty, I have provided a flow operated circuit closing mechanism which includes a housing 23 adapted to be secured by fastening devices 24 to the outer side of the hopper 21. The housing 23 includes a rear wall 25 through which the fastening devices engage, a bottom wall 26, top wall 27 and vertical side walls 28, and a closure 29 provided with marginal flanges 30 is hinged as at 31 to the housing 23.

A cylindrical bearing housing 32 is disposed within the housing 23 and has formed therewith diametrically opposed arms 33 which are adapted to be secured as by fastening devices 34 to the inner side of the rear wall 25. The cylindrical bearing housing 32 is formed with a front wall 35 having an axial opening 36 through which a rotatable shaft 37 is adapted to engage. The shaft 37 has secured to the periphery thereof inner anti-friction bearing races 38, and outer bearing races 39 are disposed in the interior of the cylindrical bearing housing 32. Anti-friction balls 40 are interposed between the two race members 38 and 39. Inner and outer spacer rings 38$^a$ and 39$^a$, respectively, are inserted between the bearing races. The bearing housing 32 at its inner or rear end has secured thereto or formed integral therewith an annular plate or head 41 which is formed with a bevelled marginal edge 42. The rear wall 25 is provided with an opening 43 in which the plate or head 41 loosely engages. The head 41 at its front side is formed with an annular channel 44 in which a lubricant retaining washer 45 is adapted to engage. Similarly the front wall 35 is formed with an annular channel 35$^a$ in which a lubricant retaining washer 35$^b$ is adapted to engage. The washers 35$^b$ and 45 may be formed of felt or the like and the washers 35$^b$ and 45 are adapted to engage tightly around shaft portions 49 and 37 respectively. Shaft 37 has groove 37$^a$ with bearing retainer 37$^b$ which locks the bearings in the housing 32. A shaft rotating blade generally designated as 46 is secured to or formed integral with the inner end 49 of the shaft 37 and the blade 46 is formed with a leading edge 47 which is disposed at an obtuse angle to the longitudinal axis of the shaft 37. The trailing edge 48 of the blade 46 is of longitudinally arcuate configuration so that the trailing edge 48 does not engage too closely adjacent the inner surface of the hopper 21 when the blade 46 is in a substantially horizontal position. The upper or outer end of the blade 46 is formed with an enlargment 49 which is formed integral with the inner end of the shaft 37. By providing the blade 46 with an obtusely disposed leading edge 47, when the blade 46 is swung to a position with the opposite sides thereof parallel with the direction of movement of the material past the blade, the material passing the leading edge 47 will not wrap about the leading edge, but will slide downwardly therealong with the movement of the material. At the present time, devices available for indicating or regulating the flow of material through a duct or the like have the leading edge or edges of the shaft operator extending at substantially right angles to the line of movement of the material and where the material is of a fibrous character, the long fibers loop about such edges and impede the function of the device and thus clog up the duct or conveyor. However, with a shaft operator constructed after the manner of blade 46, this blade will be maintained in a clean condition by the movement of the material past the blade.

When no material is present in hopper 21 the shaft operating blade 46 is spring-pressed to a substantially horizontal position or a position at right angles to the movement of the material through the hopper 21 by means of a spiral spring 50. The spring 50 at its inner end is secured by a fastening member 51 to a cylindrical sleeve 52 which engages about a reduced shaft portion 53. The reduced shaft portion 53 forms a shoulder 54 against which the sleeve 52 is adapted to engage. The opposite end of the spring 50 is secured by means of a clamping bar 55 and fastening devices 56 to the top wall 27 of the housing 23. By using the clamping bar 55, the outer end of the spring 50 may be adjusted so as to place the blade 46 under the desired tension. In order to provide a means whereby the vibrator 18 may be made active, when the hopper 21 is empty, I have provided a mercury or liquid switch 57 which is mounted in a clip structure 58. The clip structure 58 is carried by a mounting 59 secured by a fastening member 60 to the reduced shaft portion 53. The mounting 59 is adapted to abut against the forward end of the sleeve 52 and the mounting 59 is also locked against rotation relative to the shaft 53 by means of a reduced threaded stub shaft 61. A nut 62 is threaded onto the stub shaft 61 and bears against the front side of the mounting 59. The position of the mounting 59 with respect to the shaft 37 and the blade 46 may be manually adjusted so as to either cut off from or connect the control means for vibrator mechanism 18 with the conductors 19 and 20.

The mercury switch 58 has a pair of conductors 63 and 64 connected thereto which are connected to a terminal block 65 disposed on the inner side of the bottom wall 26. The conductor 20 which is connected to the vibrator mechanism 18 is connected by means of a conductor 66 to one side of the terminal block 65 and a second conductor 67 is connected to the other side of the terminal block 65 and to a source of electric current supply. The conductors 66 and 67 are adapted to be extended through an opening 68 formed in the bottom wall 26.

In Figures 6 and 7, there is disclosed a slightly modified form of this invention. A housing generally designated as 69 is adapted to be secured by fastening devices 70 to the outer side of a hopper wall or duct 71. A cylindrical bearing member 72 is disposed within the housing 69 and is provided at its inner or rear end with an enlarged head 73 loosely engaging through an opening 74 formed in the hopper or duct 71. The head or flange 73 has a bevelled rear end portion 75 which is adapted to project interiorly of the hopper wall 71, the taper or bevel 75 being provided so that no material will collect on the projecting inner end of the head 73. The bearing member 72 outwardly from the head or flange 73 is provided with threads 76 and a nut 77 is threaded onto the threads 76 and is adapted to tightly hold the bearing 71 in inwardly projecting relation with respect to the rear wall 78 of the housing 69. The bearing member 72 has rotatably mounted therein a shaft 79 which at its inner or rear end is provided with a flange or head 80.

A shaft operating blade 81 which is constructed similar in every detail to the blade 46, is formed integral with the head or flange 80 and extends at an obtuse angle to the longitudinal axis of the shaft 79. The head or flange 80 is rotatably disposed in a socket or recess 82 formed in the head or plate 73 and a fiber or felt washer 83 is interposed between the outer end of the head or flange 80 and the bottom of the socket or recess 82.

The shaft 79 is spring-pressed to a position whereby the blade 81 will be normally urged to a position at substantially right angles to the length of the hopper 71 by means of a spiral spring 84. The spring 84 has one end thereof secured as by fastening devices 85 to a reduced stub shaft 86 formed at the forward or front end of the shaft 79. The stub shaft 86 forms a shoulder 87 against which a cylindrical hub 88 is adapted to engage. The hub 88 is mounted on the stub shaft 86 and the fastening device 85 engages through one end of the spring 84 through the hub or sleeve 88 and also engages against the stub shaft 86. The opposite or outer end of the spring 86 is secured to the top wall 89 of the housing 69 by means of a clamping bar 90. The clamping bar 90 is secured to the top wall 89 by fastening devices 91 which engage through the top wall 89 and are threaded into the bar 90 on opposite sides of the spring 84. By means of the clamping bar 90, the length of the spring 84 may be adjusted in order to place the shaft operating blade 81 under the desired tension.

A liquid or mercury switch member 92 is secured to the shaft 98 for rotation or swinging movement therewith and is adapted to be connected by conductors 93 and 94 to a signalling device, a conveyor controlling or operating means or other suitable electric circuit which is adapted to be controlled by swinging movement of the blade 81. The switch member 92 is mounted in a clip structure 95 which is formed with a pair of plates 96 and 97 disposed about a reduced threaded extension 98 formed axially of the stub shaft 86. A nut 99 is threaded onto the extension 98 and is adapted to tightly hold the plate members 96 and 97 against the sleeve 88.

The shaft 79 is formed axially thereof with a lubricant channel 100 which extends outwardly through the stub shaft 86 and the extension 98 and terminates in a lubricating fitting 101. The channel 100 is formed at its inner or rear end with a laterally extending branch 102 which communicates with the periphery of the shaft 79 adjacent the head or flange 80.

Referring now to Figures 8 to 10, inclusive, the numeral 103 designates generally a housing which is adapted to be secured to the outer side of a hopper wall or duct 104. The housing 103 is adapted to be secured to the hopper wall 104 by fastening devices 105. A cylindrical bearing 106 is disposed in the housing 103 and the bearing 106 is provided at its inner or rear end with an enlarged annular head 107 engaging through an opening 108 formed in the hopper wall or duct 104. The bearing 106 is extended through an opening 109 formed in the rear wall 110 of the housing 103 and is secured in the opening 109 by means of a nut 111, which is threaded on threads 112 carried by the inner end of the bearing 106. A shaft 113 is rotatable in the bearing 106 and is provided at its inner or rear end with an annular head 114 rotatably engaging in a socket or recess 115 formed in the bearing head 107.

The head 107 is provided with a bevelled inner marginal portion 116 which projects inwardly from the inner face or surface of the hopper wall 104. A lubricant retaining washer 117 is interposed between the inner end of the head 114 and the bottom wall of the socket or recess 115. A shaft operating blade 118 which is similar in every detail to the blade 46, is secured to or formed integral with the head 114. The leading edge of the blade 118 as heretofore described with respect to the leading edge 47 of the blade 46 is disposed on an obtuse angle to the longitudinal axis of the shaft 106. The shaft 106 at its inner end is provided with a reduced stub shaft 119 about which a cylindrical hub or bushing 120 engages.

The bushing or hub 120 is fixed relative to the stub shaft 119 by means of a set screw 121. The blade 118 is normally spring-pressed or biased to a position at right angles to the length of the duct or hopper 114 by means of a spiral spring 122. One end of the spring 122 is secured by the fastening device or set screw 121 to the bushing or sleeve 120 and the opposite end of the spring 122 is secured to the top wall 123 of the housing 103 by means of a clamping bar 124. The clamping bar 124 is tightened against the spring 122 and the top wall 123 by fastening devices 125.

In order to provide a means whereby the blade 118 may be counter-balanced, I have provided a right angularly disposed weight supporting arm 126 which may be formed integral with the hub or bushing 120. The arm 126 is formed with an elongated slot 127 and a sector-shaped weight 128 is secured to one side of the arm 126 by means of a fastening device 129. Preferably the weight 128 is provided with a slot 130 in which the arm 126 is adjustably adapted to seat.

In order to provide a means whereby more than one electric circuit may be opened or closed by rotation or rocking of the shaft 113, I have provided a pair of diametrically opposed clips or holders 131 and 132. The holder 131 is adapted to have a liquid switch member 133 mounted therein and the clip 132 is adapted to have a liquid switch 134 mounted therein. The clip members or holders 131 and 132 are secured against rotation relative to the shaft 113 by means of a clamping nut 135 which is threaded onto a reduced threaded stub shaft 136.

The front wall or closure 137 of the housing 103 is provided with a substantially semi-circular opening or slot 138 and a transparent panel 139 is carried by the closure, engaging against the inner face of the front wall 137. A pointer 140 is adapted to traverse the length of the slot 138 upon rocking of the shaft 113 and the outer marginal edge of the slot 138 is provided with a plurality of graduations 141 by means of which a visible indication will be given as to the volume of material flowing past the blade 118. The pointer 140 is secured to a hub 142 which is threaded onto the stub shaft 136. The shaft 113 is formed axially thereof with a lubricating channel 143 terminating at its forward or outer end in a lubricating fitting 144. The inner end of the lubricating channel 143 terminates in a right angularly disposed channel 145. In order to provide a means whereby the blade 118 may be readily extended through the wall 104 of the hopper, the wall 104 is formed with a slot or narrow passage 146 which communicates with the annular opening 108. In this manner, the circuit making and breaking structure may be mounted on the outer side of the hopper wall 104 by merely extending the blade 118 through the opening 108 and the slot 146 and then fastening the inner or rear wall 100 to the outer side of the hopper wall 104 by the fastening devices 105. The lubricant in the bearing member 106 is sealed therein between the hub 120 and the forward or outer end of the bearing 106 by means of an annular sealing member 147 which is interposed between the inner end of the hub 120 and the outer end of the bearing 106.

In the use and operation of this device, the shaft operating blade 46 is adapted to be disposed within the interior of the hopper or duct and is normally biased by means of the tensionable spring 50 to a position at substantially right angles to the length of the hopper or duct. As the material moves through the hopper or duct, the material will cause the blade 46 to swing to a position parallel with the direction of movement of the material against the tension of the spring 50. The switch member 57 may if desired be connected to an annunciator or audible signal means and the switch member 57 is adapted to be disposed in a circuit breaking position when the blade 46 is positioned lengthwise of the hopper or duct. When the blade 46 moves to a normal position, at right angles to the length of the hopper or duct, the switch 57 is adapted to close the electric circuit.

The structure shown in Figures 6 and 7 will operate in the same manner as the structure shown in Figures 1 to 4, inclusive, the blade 81 being maintained with the leading edge thereof in a clean condition in the same manner as the leading edge 47 of the blade 46, is maintained in a clean condition by movement of the material past the blade. This is due to the obtuse angle of the leading edge of the blade 81 with respect to the movement of the material.

The structure shown in Figures 8 to 10, inclusive, will operate in a similar manner to the structure shown in Figures 1 to 7 with the exception that the blade 118 may be counterbalanced to the desired degree by adjustment of the weight 128. With a structure of this kind, the blade 118 may be made to swing to a position aligning with the direction of the material past the blade and this material may be either ground or granular material or may be a fluid such as a liquid or gas. By using two switch members 133 and 134 which are rockable with the rocking of the shaft 113 under the action of the blade 118, a pair of electric circuits may be closed and broken with the rocking of the shaft 113. Furthermore, by providing the pointer or indicator 140, the pointer of this device may give a visible indication as to the exact position of the blade 118 in the hopper or duct and by providing the graduations 141 on the closure 137, the angular position of the pointer 140 may be used to determine the approximate velocity of gaseous or liquid material flowing past the blade.

What I claim is:

1. A flow operated circuit maker and breaker for a material conveying duct comprising a housing, a cylindrical bearing in said housing, an annular flange at one end of said bearing engaging against the outer face of a wall of said housing, a nut threaded onto said bearing for binding said flange against said wall, a shaft journalled in said bearing, an obtusely disposed operating blade fixed to said shaft and positionable in said duct, a reduced stub shaft extending from the opposite end of said shaft, a sleeve on said stub shaft, a spiral spring fixed at one end to said sleeve, clamping means carried by said housing engaging the opposite end of said spring whereby said spring may be tensioned to normally maintain said blade at right angles to the length of said duct, a threaded extension coaxial with said stub shaft, a switch holder on said extension, a switch carried by said holder, and means adjustably securing said holder on said extension.

2. A flow operated circuit maker and breaker for a material conveying duct comprising a housing, a cylindrical bearing in said housing, an annular flange at one end of said bearing engaging against the outer face of a wall of said housing, a nut threaded onto said bearing for binding said flange against said wall, a shaft journalled in said bearing, an obtusely disposed operating blade fixed to said shaft and positionable in said duct, a reduced stub shaft extending from the opposite end of said shaft, a sleeve on said stub shaft, a spiral spring fixed at one end to said sleeve, clamping means carried by said housing engaging the opposite end of said spring whereby said spring may be tensioned to normally maintain said blade at right angles to the length of said duct, a threaded extension coaxial with said stub shaft, a switch holder on said extension, a switch carried by said holder, means adjustably securing said holder on said extension, said shaft, stub shaft and extension having a lubricant channel therein, and a lubricating fitting on said extension communicating with said channel.

3. A flow operated circuit maker and breaker for a material conveying duct, comprising a housing, means securing said housing on the outer side of said duct, a bearing in said housing extending partly into said duct, a shaft journalled in said bearing, a blade carried by said shaft within said housing, said blade being disposed at an obtuse angle to the length of said shaft with the opposite sides of said blade parallel with the longitudinal axis of said shaft, a spring normally urging said blade to a position at right angles to the flow of material through said duct, and a switch operatively connected with said shaft, said blade being of substantially ovoidal configuration in side elevation, and said blade being swingable in the direction of the flow of material by movement of the latter through said duct.

4. A flow operated circuit maker and breaker for a material conveying duct comprising a housing, means securing said housing on the outer side of said duct, a bearing in said housing extending partly into said duct, a shaft journalled in said bearing, a blade carried by said shaft within said housing, said blade being disposed at an obtuse angle to the length of said shaft with the opposite sides of said blade parallel with the longitudinal axis of said shaft, a coil spring fixed at one end to said shaft, means securing the opposite end of said spring to said housing, and a switch operatively connected with said shaft, said blade being of substantially ovoidal configuration in side elevation, and said blade being swingable in the direction of the flow of material by movement of the latter through said duct.

5. A flow operated circuit maker and breaker for a material conveying duct, comprising a housing, means securing said housing on the outer side of said duct, a bearing in said housing extending partly into said duct, a shaft journalled in said bearing, a blade carried by said shaft within said housing, said blade being disposed at an obtuse angle to the length of said shaft with the opposite sides of said blade parallel with the longitudinal axis of said shaft, a coil spring fixed at one end to said shaft, clamping means engaging said housing and the opposite end of said spring whereby the tension of the spring may be adjusted to normally maintain said blade at right angles to the direction of flow of material through said duct, and a switch operatively connected with said shaft, said blade being of substantially ovoidal configuration in side elevation, and said blade being swingable in the direction of the flow of material by movement of the latter through said duct.

JONAS LIEN.